United States Patent [19]
Wallace

[11] 3,888,071
[45] June 10, 1975

[54] TREE TRIMMING APPARATUS

[75] Inventor: Louie E. Wallace, Plainview, Tex.

[73] Assignee: W. F. Larson, Inc., Plainview, Tex.

[22] Filed: Oct. 9, 1973

[21] Appl. No.: 404,767

[52] U.S. Cl. .................................................. 56/237
[51] Int. Cl. .......................................... A01d 55/02
[58] Field of Search ........ 56/235, 237, DIG. 4; 47/1

[56] References Cited
UNITED STATES PATENTS
| | | | |
|---|---|---|---|
| 1,264,441 | 4/1918 | Rue | 47/1 |
| 3,496,709 | 2/1970 | Egbert et al. | 56/237 |

*Primary Examiner*—Russell R. Kinsey
*Attorney, Agent, or Firm*—Fishburn, Gold & Litman

[57] ABSTRACT

A tree trimming apparatus is adapted to trim evergreen and like trees into a conical shape and includes a mobile support structure adapted for vertically positioning and leveling a rotatably mounted platform over a tree to be trimmed. An elongated sickle bar cutting member extends through a guide housing pivotally mounted on the platform for adjusting the cutting member to selected angles whereby various conical shapes may be generated. The cutting member, further, is longitudinally adjustable in projection through the platform. In an alternate form, a spray boom is associated with the cutting member to simultaneously spray the trees during the trimming operation.

14 Claims, 8 Drawing Figures

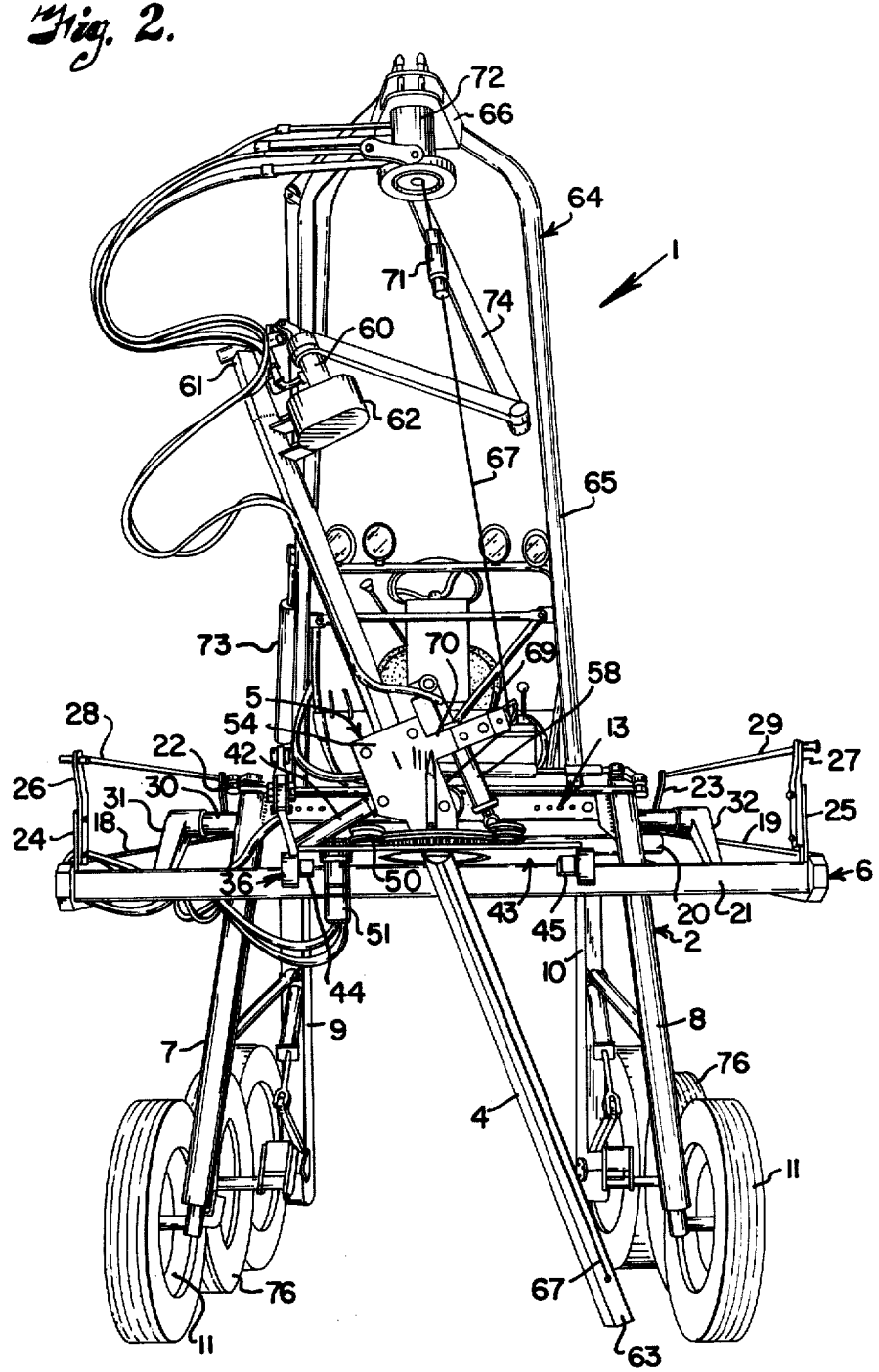

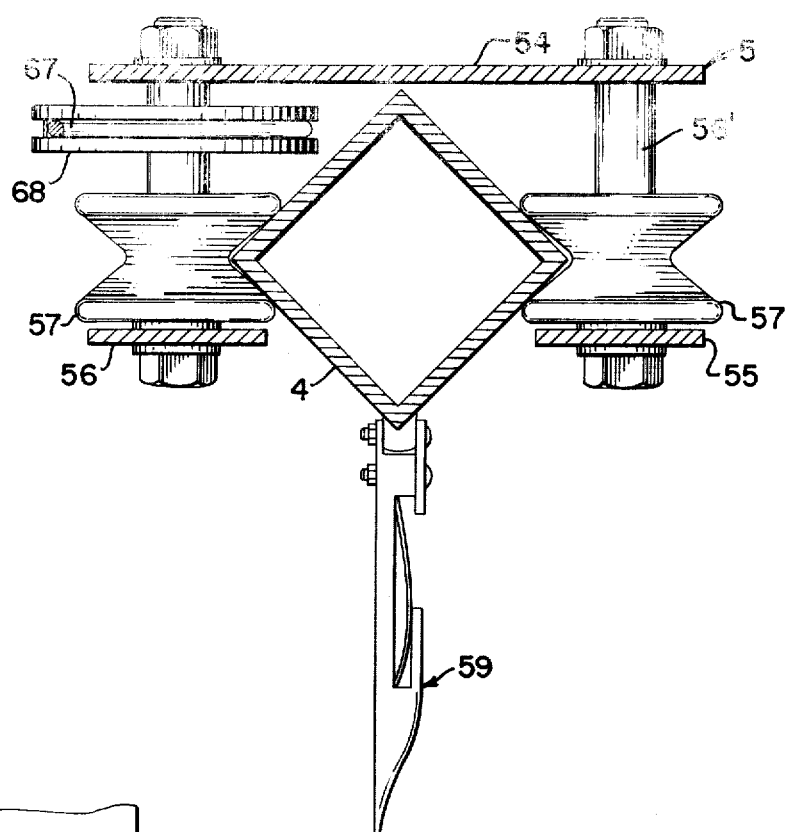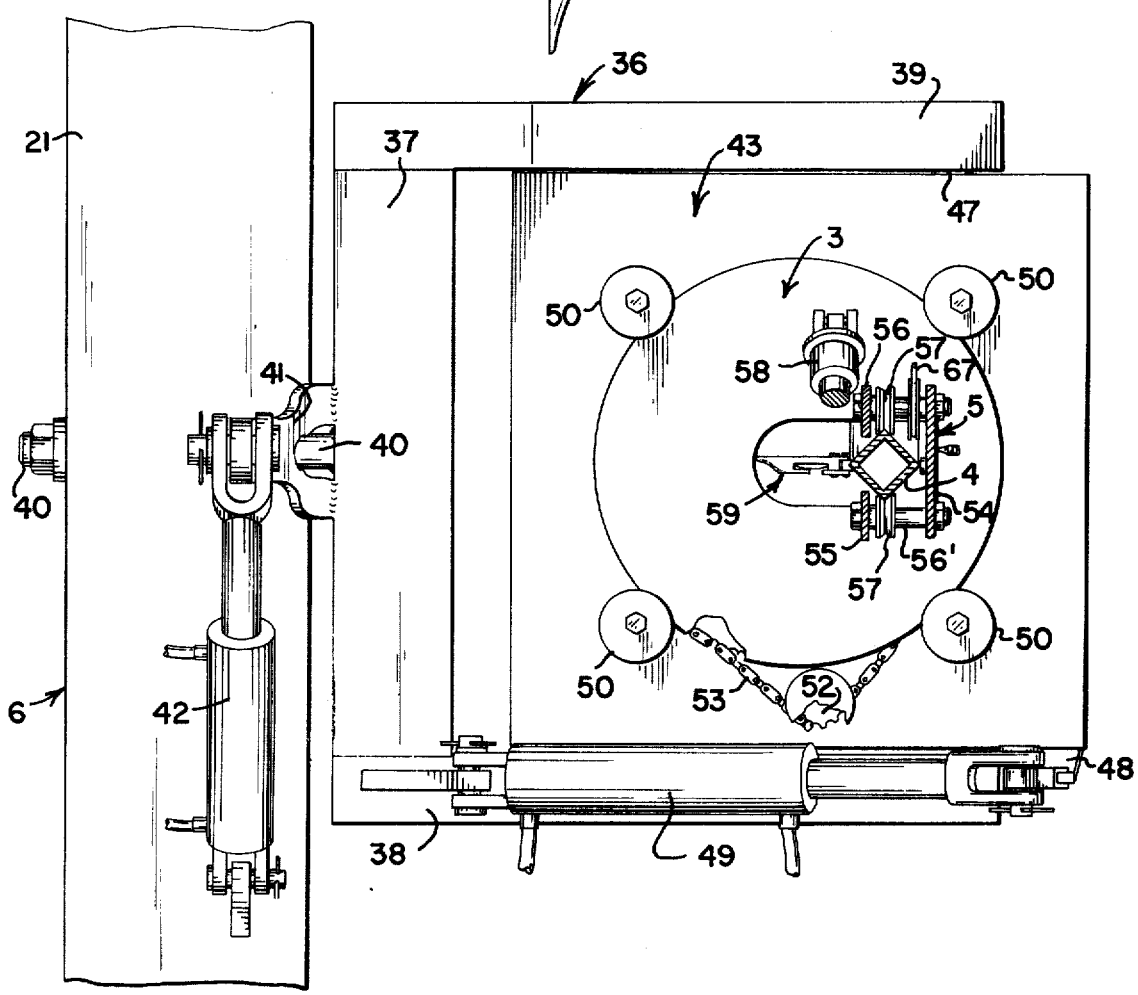

TREE TRIMMING APPARATUS

The present invention relates to improved tree trimming apparatus and more particularly to such apparatus which utilizes a power driven, highly adjustable, remotely controlled cutting member adapted to trim limbs and foliage while generating a conical tree surface.

The principal objects of the present invention are: to provide an automatic tree trimming apparatus which will quickly and easily trim evergreen trees in the field especially for the Christmas tree market; to provide such a tree trimming apparatus which will accomplish such trimming with precision and uniformity; to provide such apparatus having a rotatably mounted platform with an elongated trimming member extending therethrough and selectively easily adjustable as needed; to provide such apparatus adapted for travel over varying and rough terrain; to provide such apparatus adapted to trim trees of various heights with maximum ease; to provide such apparatus adapted to generate a vertical cutting cone when on sloping terrain, to provide such apparatus adapted to easily adjust both in height and conical angle for trimming various size trees; to provide such apparatus which may be simultaneously utilized for conical trimming and spraying, and to provide such apparatus which is durable in construction, positive in operation, economical to manufacture, and particularly well adapted for its intended purpose.

Other objects and advantages of this invention will become apparent from the following description taken in connection with the accompanying drawings wherein are set forth by way of illustration and example certain embodiments of this invention.

FIG. 2 is a front elevational view of the tree trimming apparatus.

FIG. 3 is an enlarged fragmentary top plan view of a platform and means for supporting and positioning same in a substantially horizontal position during trimming.

FIG. 6 is a further enlarged transverse sectional view through a guide housing showing the trimming member extending therethrough.

Figure 1:
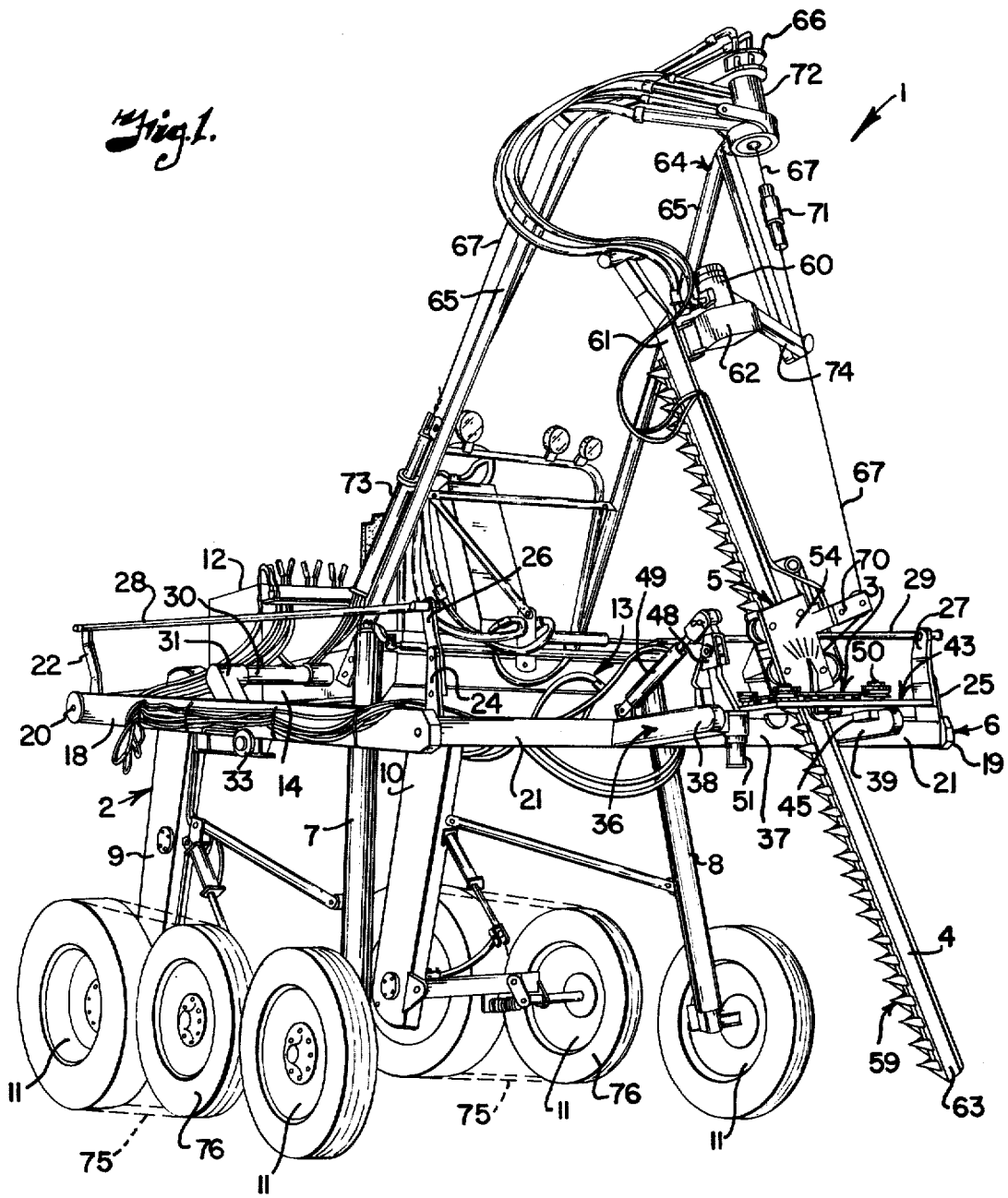
FIG. 1 is a perspective view of a tree trimming apparatus embodying features of the present invention.
Figure 4:
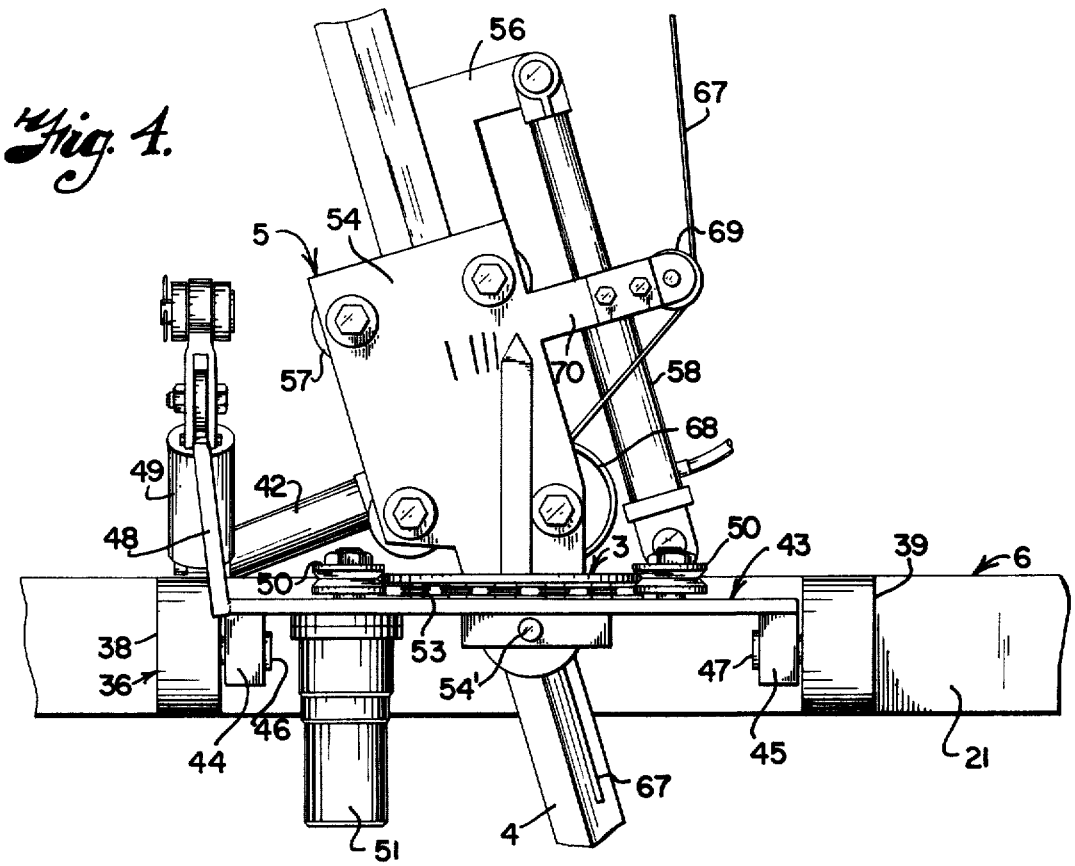
FIG. 4 is an enlarged fragmentary front elevational view of the platform and trimming member extending therethrough.

Referring more in detail to the drawings:

In the disclosed embodiment of the present invention, the reference numeral 1 generally designates a tree trimming apparatus adapted to trim evergreen trees and the like into a conical shape. The apparatus 1 includes a mobile support structure 2, in the form of a straddle mount tractor, suitable for transporting a rotatably mounted platform 3 to the area of operation. An elongated sickle bar trimming member 4 extends through a guide housing 5 which is pivotally mounted on the platform 3 for varying the angle of the trimming member 4 with respect to the platform 3. A mounting frame 6 supports the platform 3 and is adjustable to raise and lower same while maintaining a horizontal platform attitude.

The mobile support structure 2 includes a pair of front legs, designated 7 and 8, and a pair of rear legs 9 and 10. Each of the legs have suitable wheels 11 rotatably mounted thereon, the wheels on the rear legs being driven through transmission structure (not shown) by a suitable engine 12 mounted on an upper frame 13. The upper frame 13 is adapted to provide rigid support for operating components of the tree trimming apparatus 1 and in the illustrated structure includes a pair of laterally spaced side members 14 which support adjusting structure described below.

The mounting frame 6 is vertically adjustable to raise and lower the platform 3 and includes a pair of side members 18 and 19 spaced outwardly from the respective side members 14 and movable in vertical planes. A rear end portion of the mounting frame 6 is pivotally mounted on the upper frame 13, as by a shaft 20 extending between the side members 14. A cross member 21 extends between and is pivotally mounted on the forward ends of the side members 18 and 19. The cross member 21, as described below, is maintained in a substantially horizontal position during raising and lowering of the mounting frame 6 to maintain the platform 3 in a substantially horizontal position. Generally upright standards 22 and 23 are fixed to the structure 2 adjacent the rear ends of the side members 18 and 19 respectively. Upwardly extending arms 24 and 25 are suitably secured to the cross member 21 adjacent respective opposite ends thereof. Extensions 26 and 27 project upwardly from the arms 24 and 25 and connect to tie rod members 28 and 29 which extend generally parallel to 16 side members 18 and 19. Rear ends of the tie rod members 28 and 29 are pivotally connected to the upper ends of the standards 22 and 23. Thus, the raising and lowering of the mounting member 21 will also produce a rotation thereof about the side members 18 and 19 which is sufficient to maintain the cross member 21 non-rotational with respect to the ground.

The mounting frame 6 may be raised and lowered in any suitable manner to vary the spacing between the platform 3 and the ground, however, the illustrated means includes an elongated shaft 30 having respective opposite end portions thereof extending through and rotatably mounted on the side members 14 of the upper frame 13. The shaft 30 is spaced forwardly of the shaft 20 and has crank arms 31 and 32 mounted on respective opposite ends and extending adjacent the side members 18 and 19 respectively. Suitable rollers 33 are mounted on each of the crank arms 31 and 32 and engage the side members 18 and 19 whereby rotation of the shaft 30 raises and lowers the mounting frame 6.

Figure 5:
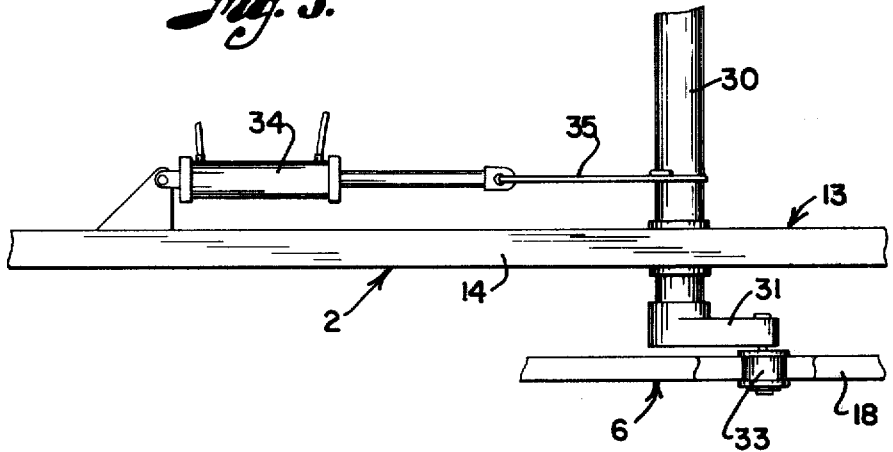
FIG. 5 is an enlarged fragmentary plan view of means for vertically positioning a mounting frame having the platform supported thereon.

The shaft 30 may be rotated in any suitable manner, such as by an extensible hydraulic cylinder 34 mounted on one of the side members 14 and having a cable 35 or the like wrapped around the shaft, FIG. 5. The extension of the cylinder 34 permits the shaft 30 to rotate in one direction to lower the mounting frame 6 and retraction is operative to raise the frame.

A frame portion 36 is pivotally mounted on the mounting member 21, as described below, and extends forwardly therefrom. The frame portion 36 is generally "U" shaped and includes an end member 37 adjacent the mounting member 21 and side members 38 and 39 extending outwardly and forwardly from respective opposite ends of the end member 37. A shaft 40 extends outwardly from the mounting member 21 and is received in a suitable bearing (not shown) mounted in the end member 37. A projection 41, FIG. 3, extends generally upwardly from the end member 37 and has one end of an hydraulic cylinder 42 pivotally connected thereto. The other or opposite end of the cylinder 42 is pivotally connected to the mounting member 21 whereby operation of the cylinder 42 effects a rotation of the frame portion 36 about a generally horizontal axis extending transversely through the mounting member 21, or longitudinally of the apparatus 1.

A platform support 43 is positioned within the space defined by the end member 37 and the side members 38 and 39 and has depending aligned ears 44 and 45. The ears 44 and 45 receive suitable axle portions 46 and 47 respectively extending inwardly from the side members 38 and 39 whereby the platform support 43 is pivotally mounted thereon for tilting about a transverse horizontal axis. An arm 48 extends upwardly from the platform support 43 adjacent the forward edge thereof and an hydraulic cylinder 49 has one end pivotally engaged therewith. The other end of the cylinder 49 is pivotally mounted on the side member 38, whereby selective operation of the cylinder is effective to produce the said tilting.

The platform 3 is mounted on the platform support 43 for rotation in the plane of the support 43 and the trimming member 4 extends angularly downwardly therethrough, whereby that portion of the trimming member 4 extending below the platform 3 is positioned to generate a conical cutting surface. In the illustrated structure, a plurality of circumferentially spaced rollers 50 are mounted on the platform support 43 and extend upwardly therefrom into rolling engagement with the periphery of the platform 3. The platform 3 may be rotated in any suitable manner, however, in the illustrated embodiment, a drive motor 51 is mounted on and beneath the platform support 43 and rotates a suitable sprocket 52 engaged with a chain 53 contacting suitable teeth formed in a portion of the platform periphery.

The guide housing 5 is pivotally mounted on the platform 3 and the trimming member 4 movably retained therein and extends therethrough. Adjustment of the guide housing angular position with respect to the platform 3 changes the conical angle of the trimming member 4. In the illustrated structure, the guide housing 5 includes a generally vertical planar plate member 54 pivotally mounted on the platform at 54' and a pair of plates 55 and 56 spaced laterally from and parallel with the planar member 54. The plates 55 and 56 are joined rigidly to the planar member 54 by spacers 56' and form supports for aligned sets of guide rollers 57. The rollers 57 present grooves into which the trimming member 4 is linearally received. An hydraulic cylinder 58 has one end thereof pivotally mounted on the platform 3 and the other end pivotally connected to an extension of the housing plate 56 whereby the desired conical angle of the trimming member 4 can be obtained.

The trimming member support 4, in this example, is in the form of generally square elongated tube having opposed corners thereof received in the grooves of the guide rollers 57. Suitable cutting elements 59 are secured to and extend outwardly from between the plates 55 and 56. The cutting elements 59 are driven by a suitable hydraulic drive motor 60 mounted adjacent an upper end 61 thereof. In the illustrated structure, a suitable gear transmission 62 is operatively connected between the cutting elements 59 and the drive motor 60 for producing the proper reciprocal cutting motion.

The trimming member 4 is selectively movable longitudinally through the guide housing 5 to position a lower end 63 thereof relative to the ground. The illustrated means for vertically supporting the trimming member 4 and for moving same through the guide housing 5 includes a boom structure 64 mounted on and extending upwardly from the upper frame 13. The upper portion 65 of the boom structure 64 includes a bracket 66 positioned directly above the platform 3.

A cable 67 has one end thereof suitably anchored to the trimming member 4 near the lower end 63 thereof and extends generally along one side of the trimming member 4 and into the guide housing 5. The cable 67 engages a pulley 68 associated with one of the rollers 57 and which directs the cable to a pulley 69 rotatably mounted on an arm 70 extending outwardly from the guide housing 5. From the pulley 69, the cable 67 extends to a swivel unit 71 positioned below the bracket 66. From the swivel unit 71, the cable 67 continues upwardly through an hydraulic fluid swivel connector housing 72 mounted on the bracket 66 and then along the boom structure 64 to one end of an hydraulic cylinder 73. The cylinder 73 is along the boom structure 64 whereby operation thereof raises and lowers the trimming member 4 relative to the ground. Such raising and lowering of the trimming member 4 is independent of the elevation, or change of elevation, of the platform 3 relative to the ground surface.

The swivel housing 72 is operative to receive and support ends of suitable supply and return lines for hydraulic fluid under pressure extending therefrom for operation of the various hydraulic components described. Linked arms 74 extend between the swivel housing 72 and the upper end 61 of the trimming member 4 and function to maintain proper relationship and alignment between the swivel housing 72 and hydraulic hoses during apparatus operation.

In using the tree trimming apparatus constructed as illustrated and described, the tractor moves along and over a row of trees. Raising and lowering the mounting frame 6 leaves all other adjustments relatively fixed, however, if indicated, both pitch and roll of the platform 3 may be adjusted for instant conditions. The side bar or trimming member support 4 is so constructed that the cutters address the trees at approximately eight degree negative rake angle and the sickle tines are at approximately the center of the platform 3. Upon rotating the platform 3 by means of the motor 51, a combing and cutting action is produced which provides excellent results.

The angle of inclination of the generated cone angle can be adjusted at any time, as desired, while the turntable is at rest or moving. Thus, trees of almost any height compatible with the structure may be trimmed on uneven ground simply and quickly.

Under conditions where it is difficult for a wheeled vehicle to travel over the terrain, suitable endless belts 75 may be utilized in conjunction with the rear drive wheels and auxiliary wheels 76 to aid in providing traction.

Figure 7:
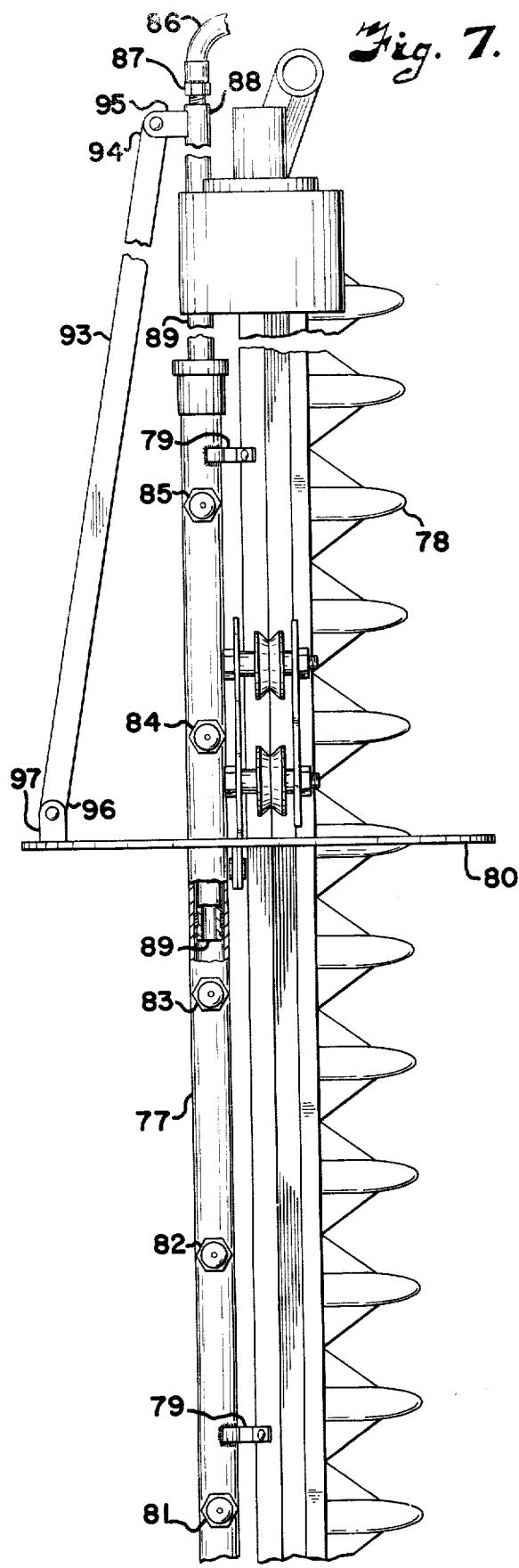
FIG. 7 is a fragmentary view of a modified form of trimming member which includes a spray boom.
Figure 8:
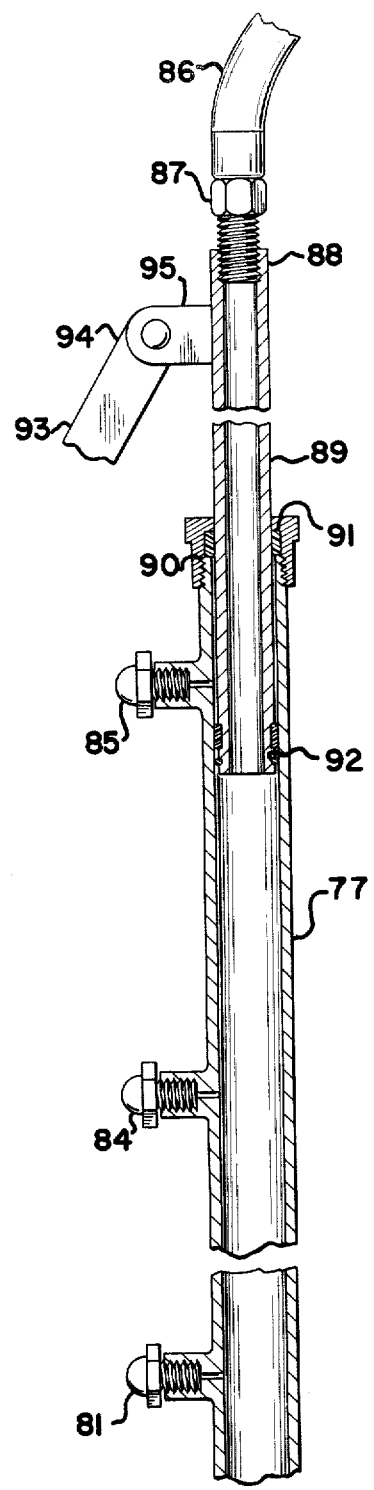
FIG. 8 is a fragmentary cross-sectional view showing details of the spray boom.

Referring to FIGS. 7 and 8, a modified form of tree trimming apparatus may include various parts similar to those described above but, in addition, a spray boom and auxiliary structure, permitting the spraying of the trees with desired chemicals simultaneously with the conical trimming operation. In this embodiment a spray boom 77 is suitably mounted on the sickle bar trimming member 78 by means of spaced brakcets 79. The boom 77 extends parallel to the trimming member 78 and projects through a suitably enlarged opening in the rotating platform 80. Spaced spray nozzles 81, 82, 83, 84 and 85 are positioned along the boom 77 and preferably directed generally centrally of the cone generated by trimming member 78 when rotated by the platform 80.

Liquid for spraying is supplied by various conventional tanks, pumps and plumbing (all not shown) carried by the tractor and feeding into a hose 86 located above the boom 77. The hose 86 is connected by means of a fitting 87 into the upper end 88 of the hollow tube 89 which is received telescopically into the upper end 90 of the spray boom 77. Sliding seals 91 and 92 permit the relative, co-axial movement of the tube 89 and boom 77 without leakage from the joints.

A control bar 93 is loosely pivotally connected, at the upper end 94 thereof, to a mounting lug 95 projecting laterally from the upper end 88 of the hollow tube 89. The lower end 96 of the bar 93 is loosely pivotally connected to an upstanding lug 97 secured to the platform 80. The control bar 93 thus acts as a restraint preventing axial movement of the tube 89 with respect to the platform 80, even though the boom 77 is raised and lowered and tilted therethrough. The length of the tube 89 is such that the seal 92 on the lower end thereof may extend below one or more of the boom nozzles (nozzle 85, FIG. 8) depending upon the relative telescopic positions of the boom and tube, thereby effectively cutting off flow of chemicals to all nozzles except those positioned below the platform 80.

In operation, the boom is vertically and angularly adjusted as heretofore described to generate the desired conical figure upon rotation of the platform 80. The nozzles positioned above the platform 80 are automatically blocked by the seal 92, leaving the remaining nozzles, i.e., those below the platform, active to spray the tree, simultaneously with the trimming operation if desired.

It is to be understood that while certain forms of this invention have been illustrated and described, it is not to be limited thereto except insofar as such limitations are included in the following claims.

What I claim and desire to secure by Letters Patent is:

1. A tree trimming apparatus comprising:
   a. a mobile support structure;
   b. a platform adjustably mounted on said support structure;
   c. means operatively connected to said platform and support structure for positioning said platform in a desired attitute relative to the ground;
   d. an elongated trimming member having an upper end and a lower end and extending through said platform;
   e. means mounted on said platform and engageable with said trimming member for positioning same at a selected angle relative to said platform;
   f. means for selectively longitudinally positioning said trimming member relative to said platform; and
   g. means operatively connected to said platform for rotating same relative to said support structure thereby moving said trimming member in a path defining a selected geometric surface of revolution.

2. A tree trimming apparatus as set forth in claim 1 wherein said means for positioning said platform includes:
   a. a frame portion pivotally mounted on said support structure;
   b. extensible means extending between and connected to said frame portion and to said mobile support structure for selectively pivoting said frame portion;
   c. a platform support portion having said platform rotatably supported thereon and pivotally mounted on said frame portion; and
   d. extensible means extending between and connected to said frame portion and to said platform support portion for selectively pivoting said platform support portion.

3. A tree trimming apparatus as set forth in claim 1 wherein:
   a. said mobile support structure includes a mounting member engaging and supporting said means for positioning said platform;
   b. said mounting member being adjustably arranged with respect to said support structure for selectively raising and lowering said mounting member relative to the ground.

4. A tree trimming apparatus as set forth in claim 1 wherein said means for longitudinally positioning said trimming member includes:
   a. an arm fixedly mounted on said mobile support structure and having a support portion positioned above said platform;
   b. a cable extending between said arm and said trimming member and through said platform; and
   c. means for selectively adjusting the longitudinal position of said cable with respect to said arm.

5. A tree trimming apparatus as set forth in claim 1 wherein:
   a. said means for positioning said trimming member at a selected angle includes a guide housing having said trimming member extending therethrough;
   b. said guide housing is pivotally mounted for movement relative to said platform;
   c. extensible means is connected to said platform and to said guide housing for selectively pivotting said guide housing relative to said platform; and
   d. said trimming member has the upper end thereof positioned above said platform during rotation of said platform.

6. A tree trimming apparatus as set forth in claim 1 including:
   a. a spray boom mounted on said trimming member and positionable therewith, and
   b. means supplying spraying liquid to said boom.

7. A tree trimming apparatus as set forth in claim 6 wherein:
   a. said means supplying liquid to said boom includes a hollow tube telescoping axially into said boom and adapted to block the passage of liquid into a portion of said boom.

8. A tree trimming apparatus comprising:
   a. a mobile support structure;
   b. a mounting frame mounted on said mobile support structure and having a mounting member spaced outwardly from said mobile support structure;

c. a platform and means mounting same on said mounting member;

d. means operatively connected to said mounting member and to said means mounting said platform on said mounting member for positioning said platform in a substantially horizontal position;

e. an elongated trimming member having an upper end and a lower end and extending through said platform;

f. means mounted on said platform and engageable with said trimming member for positioning same at a selected angle relative to said platform;

g. means mounted on said mobile support structure for rotatably supporting the upper end of said trimming member above said platform and for selectively positioning the lower end of said trimming member relative to a ground surface;

h. means mounted on said means mounting said platform on said mounting member and operatively connected to said platform for rotating same thereby moving said trimming member in a path defining a selected geometric surface of revolution.

9. A tree trimming apparatus as set forth in claim 8 including:

a. means mounted on said mobile support structure and operatively engageable with said mounting frame for selectively raising and lowering said mounting member and said platform mounted thereon; and b. linkage means extending between opposite ends of said mounting frame and operatively connected to said mounting member for maintaining said platform in a substantially horizontal position during raising and lowering of said platform.

10. A tree trimming apparatus as set forth in claim 8 wherein:

a. said means mounting said platform on said mounting member includes a frame portion pivotally mounted on said mounting member and a platform support portion having said platform rotatably supported thereon and pivotally mounted on said frame portion;

b. first extensible means extending between and connected to said frame portion and to said mounting member for selectively pivoting said frame portion; and c. second extensible means extending between and connected to said frame portion and to said platform support portion for selectively pivoting said platform support portion.

11. A tree trimming apparatus as set forth in claim 10 wherein:

a. said means for positioning said trimming member at a selected angle relative to said platform includes a guide housing having said trimming member extending therethrough;

b. the guide housing is pivotally mounted for movement relative to said platform;

c. extensible means extends between and has respective opposite ends pivotally connected to said platform and to said guide housing for selectively moving said guide housing relative to said platform;

d. said mounting frame is pivotally mounted on said mobile support structure; and e. said mobile support structure has means thereon in engagement with said mounting frame for selectively raising and lowering said mounting member and said platform mounted thereon relative to the ground surface.

12. A tree trimming apparatus as set forth in claim 11 wherein:

a. said means for rotatably supporting the upper end of said trimming member includes an arm fixedly mounted on said mobile support structure and having a support portion positioned above said platform and an elongated flexible member depending from said support portion of said arm and having one end thereof connected to the upper end of said trimming member;

b. an extensible member is mounted on said arm and is connected to the other end of said flexible member for selectively raising and lowering said trimming member; and c. said flexible member has swivel means intermediate the ends thereof to permit rotation of said trimming member.

13. A tree trimming apparatus as set forth in claim 8 including:

a. a spray boom mounted on said trimming member and extending therealong.

14. A tree trimming apparatus as set forth in claim 13 including:

a. a plurality of spray nozzles spaced along said spray boom, b. a hollow tube telescoping downwardly into said boom, said tube having a seal engaging said boom and preventing the flow of spray liquid from said tube into nozzles spaced above said seal.

* * * * *